US008913526B2

(12) United States Patent
Jung (10) Patent No.: US 8,913,526 B2
(45) Date of Patent: Dec. 16, 2014

(54) SIGNALING IN WIRELESS COMMUNICATION SYSTEMS

(71) Applicant: Korea Advanced Institute of Science and Technology, Daejeon (KR)

(72) Inventor: Bang Chul Jung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 13/867,906

(22) Filed: Apr. 22, 2013

(65) Prior Publication Data

US 2013/0230115 A1    Sep. 5, 2013

Related U.S. Application Data

(63) Continuation of application No. 12/604,290, filed on Oct. 22, 2009, now Pat. No. 8,428,547.

(51) Int. Cl.
| | |
|---|---|
| *H04B 1/56* | (2006.01) |
| *H04L 25/24* | (2006.01) |
| *H04L 25/03* | (2006.01) |
| *H04L 25/02* | (2006.01) |

(52) U.S. Cl.
CPC ............ *H04L 25/0204* (2013.01); *H04L 25/24* (2013.01); *H04L 25/03331* (2013.01)
USPC ...................................................... 370/276

(58) Field of Classification Search
CPC ........... H04N 19/00236; H04L 1/0026; H04L 27/2647; H04L 1/0009; H04L 2001/0093; H04L 27/2601; H04L 2025/03426; H04L 1/0693; H04L 27/2646; H04L 5/0007

USPC ................. 370/276, 277, 278, 282; 455/403, 455/422.1, 450, 454
See application file for complete search history.

(56) References Cited

U.S. PATENT DOCUMENTS

| | | | | |
|---|---|---|---|---|
| 7,463,703 | B2 * | 12/2008 | McElwain | 375/341 |
| 8,050,618 | B2 * | 11/2011 | Kwun et al. | 455/7 |
| 8,223,882 | B2 * | 7/2012 | Tsouri et al. | 375/295 |
| 2003/0133520 | A1 | 7/2003 | Jayaraman et al. | |

(Continued)

FOREIGN PATENT DOCUMENTS

| | | |
|---|---|---|
| EP | 2081313 | 7/2009 |
| WO | 2006/071187 | 7/2006 |

OTHER PUBLICATIONS

Shengli Zhang et al, "Physical-Layer Network coding", International Conference on Mobile Computing and Networking, 2006, p. 358-365.

(Continued)

*Primary Examiner* — Fan Ng
(74) *Attorney, Agent, or Firm* — Maschoff Brennan (57) ABSTRACT

A communication device includes an RF receiver that receives a combined signal including a first signal transmitted from a first node and a second signal transmitted from a second node, a channel estimator that estimates first channel information of the first signal and second channel information of the second signal, respectively, a multiuser detector that detects original signal values of the combined signal using the estimated first and second channel information and an RF transmitter that transmits a signal generated based on the values detected by the multiuser detector to the first node and the second node during a predetermined period.

6 Claims, 7 Drawing Sheets

(56) References Cited

U.S. PATENT DOCUMENTS

| | | | |
|---|---|---|---|
| 2007/0211786 A1 | 9/2007 | Shattil | |
| 2008/0013610 A1* | 1/2008 | Varadarajan et al. | 375/221 |
| 2008/0063115 A1* | 3/2008 | Varadarajan et al. | 375/299 |
| 2008/0125032 A1* | 5/2008 | Jung et al. | 455/7 |
| 2008/0165720 A1* | 7/2008 | Hu et al. | 370/315 |
| 2009/0046569 A1* | 2/2009 | Chen et al. | 370/203 |
| 2009/0047901 A1* | 2/2009 | Yu et al. | 455/7 |
| 2009/0262678 A1* | 10/2009 | Oyman et al. | 370/315 |
| 2009/0296626 A1* | 12/2009 | Hottinen et al. | 370/315 |
| 2010/0124186 A1* | 5/2010 | Josiam et al. | 370/315 |
| 2010/0296463 A1* | 11/2010 | Taoka et al. | 370/329 |
| 2010/0303162 A1* | 12/2010 | Wang et al. | 375/260 |
| 2011/0080982 A1* | 4/2011 | Bottomley et al. | 375/346 |
| 2011/0305195 A1* | 12/2011 | Forck et al. | 370/328 |

OTHER PUBLICATIONS

Zhang, S. et al. "Channel coding and decoding in a relay system operated with physical-layer network coding" IEEE Journal on Selected Areas of Communication, Jun. 12, 2009, Abstract, Introduction, pp. 9-11, Section IV, vol. 27, Issue 5.

Rossetto F. et al. "On the Design of Practical Asynchronous Physical Layer Network Coding" IEEE 10th Workshop on Signal Processing Advances in Wireless Communication, SPA WC Jun. 21-24, 2009, Abstract, Introduction, Section 1, Figures 1 and 2, Section 2 and Section 4 Whole Document.

Katti, S., "XORs in the Air: Practical Wireless Network Coding" IEEE/ACM Transactions on Networking, Jun. 2003, Whole document, vol. 16, No. 3.

International Search Report dated Jan. 25, 2011 as received in related PCT Application No. PCT/KR2010/007196.

* cited by examiner

FIG. 1A

→ TIME SLOT 1
--→ TIME SLOT 2

SIGNALING IN WIRELESS COMMUNICATION SYSTEMS

CROSS-REFERENCE TO RELATED APPLICATIONS

This patent application is a continuation of U.S. patent application Ser. No. 12/604,290, filed Oct. 22, 2009, which is incorporated herein by reference.

BACKGROUND

Wireless communication systems are widely deployed to provide mobile devices with various contents, such as voice, text, image, and moving pictures. For example, multiple channel access techniques allow multiple users to share system resources, such as bandwidth and transmission power. Examples of multiple channel access techniques include code division multiple access (CDMA) systems, time division multiple access (TDMA) systems, frequency division multiple access (FDMA) systems, or orthogonal frequency division multiple access (OFDMA) systems. Such multiple channel access techniques can simultaneously support communication between multiple mobile devices.

SUMMARY

Various embodiments of communication devices and communication methods are disclosed herein. In one embodiment, a communication device includes an RF receiver that receives a combined signal including a first signal transmitted from a first node and a second signal transmitted from a second node, a channel estimator that estimates first channel information of the first signal and second channel information of the second signal, respectively, a multiuser detector that detects original signal values of the combined signal using the estimated first and second channel information, and an RF transmitter that transmits a signal generated based on the original signal values detected by the multiuser detector to the first node and the second node during a predetermined period.

In another embodiment, a communication method includes estimating first channel information of a first signal and second channel information of a second signal transmitted simultaneously from different nodes, detecting original signal values of a combined signal including the first signal and the second signal based on the estimated first and second channel information by a multiuser detector, and transmitting a signal generated based on the detected original signal values to the different nodes during a predetermined period.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In one embodiment, the present disclosure provides a communication device including a multiuser detector that detects values of a combined signal. The combined signal includes a first signal transmitted from a first node and a second signal transmitted from a second node using estimated first and second channel information.

Figure 1A:
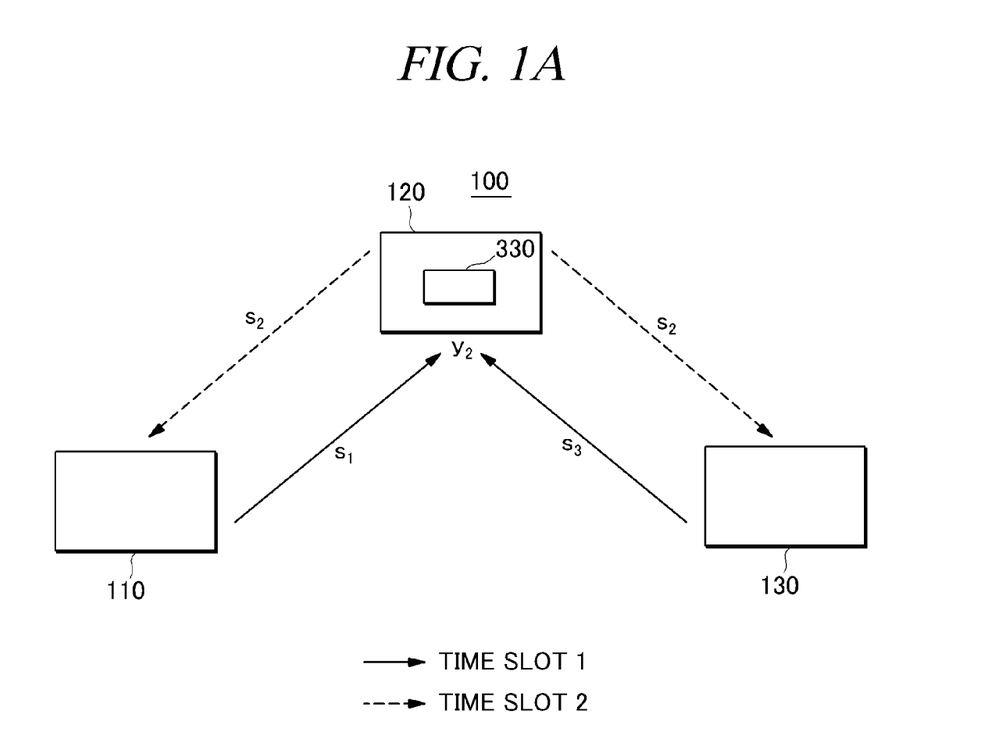
FIG. 1A shows a schematic diagram of an illustrative embodiment of a communication system.
Figure 1B:
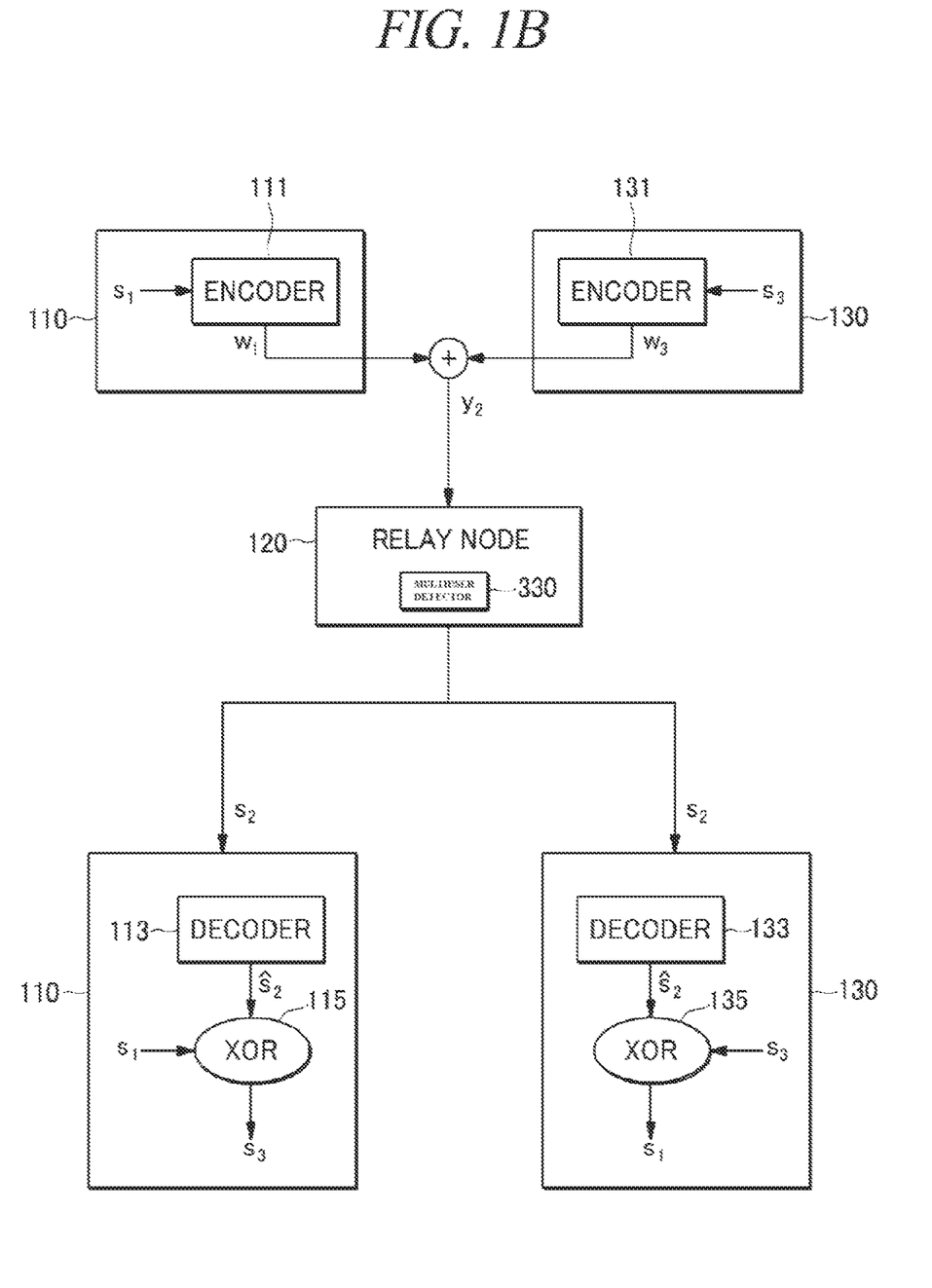
FIG. 1B shows a schematic block diagram illustrating components of the communication devices of the communication system of FIG. 1A.

FIG. 1A is a schematic diagram of an illustrative embodiment of a communication system. FIG. 1B is a schematic block diagram illustrating components of the communication devices of the communication system of FIG. 1A. As depicted in FIG. 1A, a communication system 100 includes multiple communication devices 110, 120 and 130. Each communication device 110, 120 or 130 can transmit, receive or relay signals, and act as either a source node or a relay node. Various types of handheld communication apparatuses such as, but not limited to, mobile phones, smart phones or Personal Digital Assistants (PDAs) can be used for communication devices 110, 120 and 130. For the purpose of description, it is assumed hereinafter that communication devices 110 and 130 each act as a source node (for example, first node 110 and second node 130), and communication device 120 acts as a relay node. However, one of ordinary skill in the art will appreciate that any of communication devices 110, 120 and 130 can act as a source node, a relay node, or a combination thereof.

As depicted in FIG. 1A, first node 110 and second node 130, as source nodes, substantially simultaneously transmit signals $s_1$ and $s_3$ to relay node 120 during a time slot 1 (as depicted by a solid directional line in FIG. 1A). As used herein the time slot 1 can be defined as an uplink slot during which signals $s_1$ and $s_3$ of first and second nodes 110 and 130 are transmitted to relay node 120 based on a predetermined communication protocol.

The transmitted first and second signals $s_1$ and $s_3$ are combined on a physical layer such as, but not limited to, air interface, to generate a combined signal $y_2$. Combined signal $y_2$ is received at relay node 120. When combined signal $y_2$ is distorted after passing through multi path fading channel, the original signal values of combined signal $y_2$ can be detected by a multiuser detector 330 of relay node 120, which will be further described in detail hereinafter. As used herein, the original signal values of combined signal $y_2$ refer to the values of combined signal $y_2$ in which no distortion is occurred. Relay node 120 then transmits signal $s_2$ generated based on the detected original signal values of combined signal $y_2$ to first node 110 and second node 130 during a time slot 2 (as depicted by a broken or dashed directional line in FIG. 1A). As used herein, the time slot 2 can be defined as a downlink slot during which signal $s_2$ is received at first and second nodes 110 and 130 based on the predetermined communication protocol.

As depicted in FIG. 1B, first node 110 includes a first encoder 111, a first decoder 113 and a first XOR (exclusive or) operator 115. Second node 130 includes a second encoder 131, a second decoder 133 and a second XOR (exclusive or) operator 135.

First and second encoders 111 and 131 perform channel coding on signals $s_1$ and $s_3$ to generate encoded signals $w_1$ and $w_3$, respectively. In some embodiments, first and second encoders 111 and 131 perform the channel coding by selectively inserting redundant bits into signals $s_1$ and $s_3$. By inserting redundant bits, bit errors of signals $s_1$ and $s_3$ can be detected and corrected so that reliable signal transmission is achieved. First node 110 and second node 130 transmit encoded signals $w_1$ and $w_3$, respectively, for reception by relay node 120. Prior to reception by relay node 120, encoded signals $w_1$ and $w_3$ are combined on a physical layer, such as an air interface.

Relay node 120 receives combined signal $y_2$ including encoded signals $w_1$ and $w_3$. Further, relay node 120 detects original signal values of combined signal $y_2$ using multiuser detector 330 and generates signal $s_2$ using the original signal values, which will be further described hereinafter. Relay node 120 transmits signal $s_2$ to both first node 110 and second node 130.

First decoder 113 of first node 110 decodes signal $s_2$ and second decoder 133 of second node 130 decodes signal $s_2$. First and second decoders 113 and 133 provide decoded signal $\hat{s}_2$ to first and second XOR operators 115 and 135, respectively.

First XOR operator 115 of first node 110 performs an XOR operation on decoded signal $\hat{s}_2$ and first signal $s_1$ to generate second signal $s_3$ that has been transmitted from second node 130. Since decoded signal $\hat{s}_2$ is the decoded signal of signal $s_2$ which is generated using combined signal $y_2$, it includes first signal $s_1$ and second signal $s_3$. Thus, first node 110 can receive second signal $s_3$ transmitted from second node 130 using the XOR operation.

Second XOR operator 135 of second node 130 performs an XOR operation on decoded signal $\hat{s}_2$ and second signal $s_3$ to generate first signal $s_1$ that has been transmitted from first node 110. Since decoded signal $\hat{s}_2$ includes first signal $s_1$ and second signal $s_3$, as described above, second node 130 can receive first signal $s_1$ using the XOR operation.

In the illustrative embodiment, signals (for example, signal $s_1$ and signal $s_3$) can be transmitted and received between first and second nodes 110 and 130 which are far away from each other during relatively short time periods, for example, two time slots (for example, time slots 1 and 2).

In the above-stated illustrative embodiment, the channel codes used by encoders 111 and 131 and decoders 113 and 133 have linearity. For example, the channel codes may include Linear Block Codes, such as Hamming codes, Golay codes, BCH codes, Reed Solomon codes and (Linear) Convolution Codes. However, the channel codes used by encoders 111 and 131 and decoders 113 and 133 are not limited thereto and any channel code having linearity may be employed.

Figure 2:
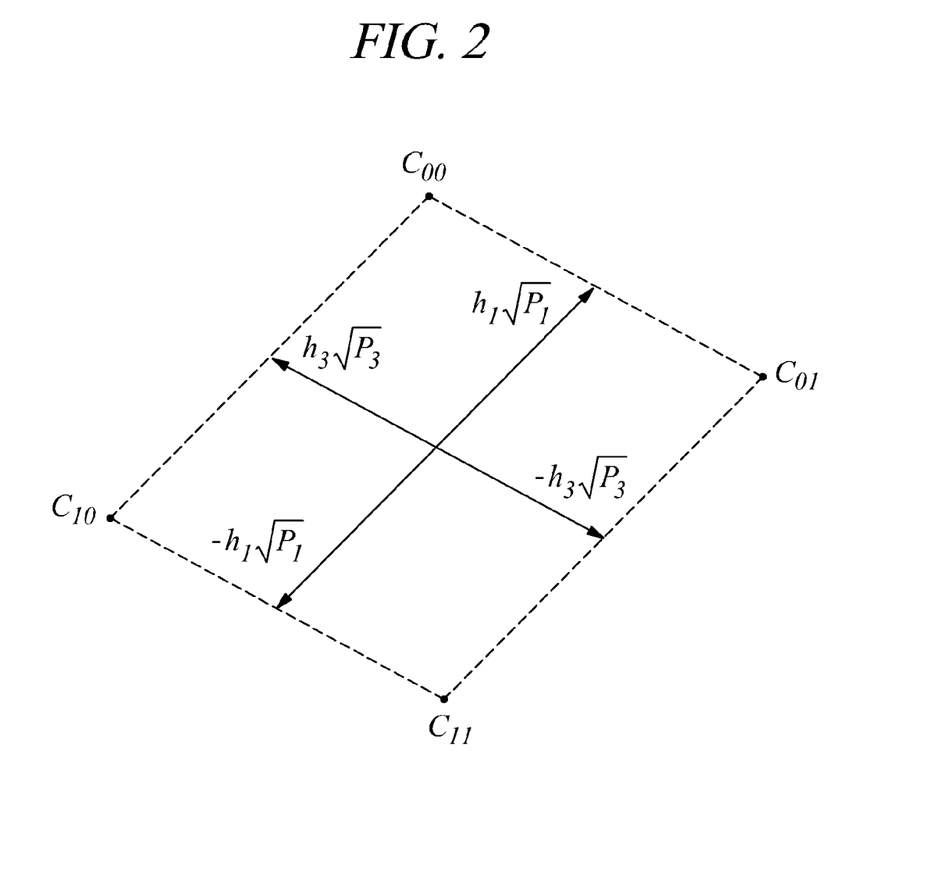
FIG. 2 shows a schematic diagram of symbol candidates of the signal received by the relay node shown in FIGS. 1A and 1B.

FIG. 2 is a schematic diagram of symbol candidates of a signal received by the relay node of FIGS. 1A and 1B. A combined signal including multiple signals is expressed with information of signals each transmitted from a multiple number of nodes and channel information of the transmitted signals. The channel information includes a channel coefficient of an ith node at a certain time slot and an average received power level at the ith node. By way of example, but not limitation, the channel coefficient may be an independent and identically-distributed (i.i.d.) complex Gaussian random variable with variance one (1). Further, noise is added to the combined signal. The noise may be Additive White Gaussian Noise (AWGN) whose power spectral density is $N_0$, but the noise is not limited thereto.

For example, the combined signal received by relay node 120 (see FIG. 1A) is expressed by Equation 1 as follows.

$$y_2 = h_1\sqrt{P_1}x_1 + h_3\sqrt{P_3}x_3 + n \quad \text{[Equation 1]}$$

Here, $x_1$ denotes a symbol value of first signal $s_1$ transmitted from first node 110 (see FIG. 1A), $x_3$ denotes a symbol value of second signal $s_3$ transmitted from second node 130 (see FIG. 1A) and $y_2$ denotes the combined signal received by relay node 120. Further, $h_1$ and $h_3$ respectively denote channel coefficients of first signal $s_1$ and second signal $s_3$, and $P_1$ and $P_3$ respectively denote average received power levels at first node 110 and second node 130. Furthermore, n denotes Additive White Gaussian Noise (AWGN) added to first signal $s_1$ and second signal $s_3$.

For example, if first node 110 and second node 130 transmit BPSK (Binary Phase Shift Keying) modulated signals, symbol values $x_1$ and $x_3$ are minus one (−1) or one (1). Accordingly, combined signal $y_2$ has four possible symbol candidates as expressed in the following Equation 2.

$$C_{00} = h_1\sqrt{P_1} + h_3\sqrt{P_3},\ C_{10} = -h_1\sqrt{P_1} + h_3\sqrt{P_3},$$

$$C_{11} = -h_1\sqrt{P_1} - h_3\sqrt{P_3},\ C_{01} = h_1\sqrt{P_1} - h_3\sqrt{P_3} \quad \text{[Equation 2]}$$

In Equation 2, $C_{00}$ is a possible symbol candidate when symbol value $x_1$ of first signal $s_1$ is one (1) and symbol value $x_3$ of second signal $s_3$ is one (1). $C_{10}$ is a possible symbol candidate when symbol value $x_1$ of first signal $s_1$ is minus one (−1) and symbol value $x_3$ of second signal $s_3$ is one (1). $C_{11}$ is a possible symbol candidate when symbol value $x_1$ of first signal $s_1$ is minus one (−1) and symbol value $x_3$ of second signal $s_3$ is minus one (−1). $C_{01}$ is a possible symbol candidate when symbol value $x_1$ of first signal $s_1$ is one (1) and symbol value $x_3$ of second signal $s_3$ is minus one (−1).

Referring to FIG. 2 and Equation 2, combined signal $y_2$ is determined as one (1) if the symbol of combined signal $y_2$ is detected as $C_{10}$ or $C_{01}$. Further, combined signal $y_2$ is determined as zero (0) if the symbol of combined signal $y_2$ is detected as $C_{00}$ or $C_{11}$. Since, first signal $s_1$ and second signal $s_3$ are combined during time slot 1 (as depicted by a solid arrow in FIG. 1A), symbol value $x_1$ of first signal $s_1$ and symbol value $x_3$ of second signal $s_3$ are XOR operated each other. Accordingly, if symbol value $x_1$ and $x_3$ are the same, combined signal $y_2$ is one (1) and if symbol value $x_1$ and $x_3$ are different, combined signal $y_2$ is zero (0).

Although the BPSK modulation signals have been illustrated above, it will be apparent to those skilled in the art that any modulation method, such as M-QAM (Quadrature Amplitude Modulation) method can also be used.

Figure 3:
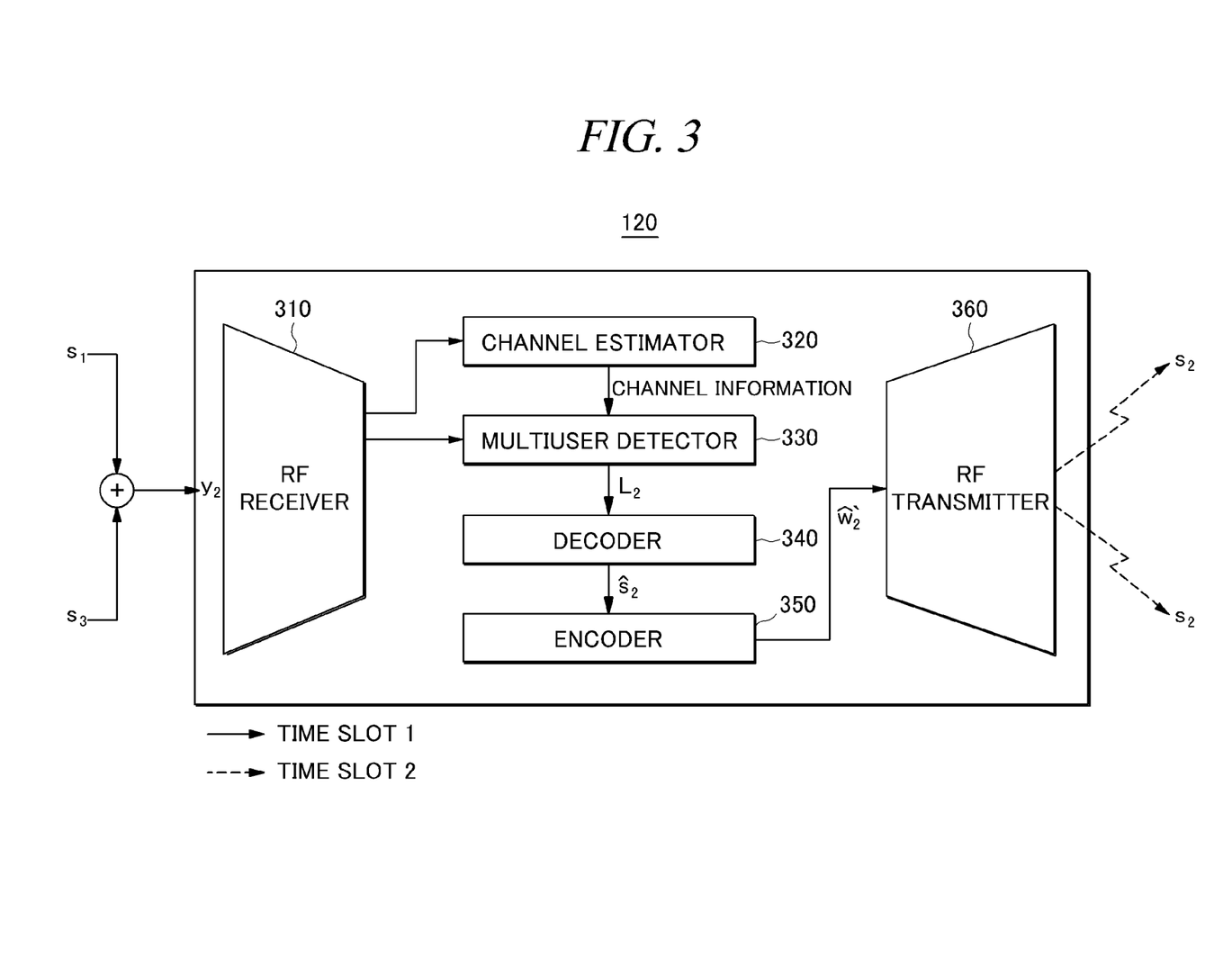
FIG. 3 shows a detailed block diagram of an illustrative embodiment of the relay node shown in FIGS. 1A and 1B.

FIG. 3 is a detailed block diagram of an illustrative embodiment of the relay node shown in FIGS. 1A and 1B. In the illustrative embodiment, relay node 120 includes an RF (Radio Frequency) receiver 310, a channel estimator 320, a multiuser detector 330, a decoder 340 (optional), an encoder 350 (optional) and an RF transmitter 360.

RF receiver 310 receives combined signal $y_2$ including first signal $s_1$ transmitted from first node 110 (see FIG. 1A) and second signal $s_3$ transmitted from second node 130 (see FIG. 1A) during time slot 1 (as depicted by a solid directional line in FIG. 3). As discussed in the paragraphs [0018], first signal $s_1$ and second signal $s_3$ may be encoded signals and they can be combined on a physical layer. RF receiver 310 provides combined signal $y_2$ to multiuser detector 330. Further, RF receiver 310 receives first and second pilot signals (not shown) from first and second nodes 110 and 130 and provides the received first and second pilot signals to channel estimator 320.

Channel estimator 320 estimates channel information including a received power level and a channel coefficient by using the first and second pilot signals received by RF receiver 310. For example, channel estimator 320 estimates first channel information including a first received power level and a first channel coefficient of first signal $s_1$ by using the first pilot signal transmitted from first node 110 through RF receiver 310. Further, channel estimator 320 estimates second channel information including a second received power level and a second channel coefficient of second signal $s_3$ by using the second pilot signal transmitted from second node 130 through RF receiver 310. Then, channel estimator 320 provides the estimated first and second channel information to multiuser detector 330.

Multiuser detector 330 detects original signal values of combined signal $y_2$ received from RF receiver 310 using the estimated first and second channel information received from channel estimator 320. The values detected by multiuser detector 330 may be, but not limited to, one (1) or zero (0), and can be varied depending on a modulation method.

Multiuser detector 330 employs various detecting methods such as, but not limited to, a joint ML (maximum likelihood) detecting method and any other multiuser detecting method.

To detect the original signal values of combined signal $y_2$, multiuser detector 330 is configured to execute LLR (log likelihood ratio) computation of combined signal $y_2$. For example, if BPSK is used as a modulation method, the LLR (log likelihood ratio) value is calculated by Equation 3 as follows.

$$\Lambda_{s_2} = \log\frac{P(s_2 = 0 \mid y_2)}{P(s_2 = 1 \mid y_2)} \quad \text{[Equation 3]}$$
$$= \log\frac{P(s_1 = 0, s_3 = 0 \mid y_2) + P(s_1 = 1, s_3 = 1 \mid y_2)}{P(s_1 = 1, s_3 = 0 \mid y_2) + P(s_1 = 0, s_3 = 1 \mid y_2)},$$

Here, $\Lambda_{s_2}$ denotes the LLR (log likelihood ratio) value, and P(A) denotes a probability of occurrence of an event A. For example, $P(s_1=0, s_3=0 \mid y_2)$ is a probability of occurrence of an event in which, when combined signal $y_2$ is received, the values of first signal $s_1$ and second signal $s_3$ are zero (0), respectively. If $\Lambda_{s_2}$ is equal to or less than zero (0), the original signal value of combined signal $y_2$ is determined as one (1). If $\Lambda_{s_2}$ is larger than zero (0), the original signal value of combined signal $y_2$ is determined as zero (0).

Further, assuming that a first probability (the value of first signal $s_1$ is zero (0)) and a second probability (the value of first signal $s_1$ is one (1)) are equal; and that a third probability (the value of second signal $s_3$ is zero (0)) and a fourth probability (the value of second signal $s_3$ is one (1)) are equal, Equation 3 is expressed by the following Equation 4 according to Bayes' rule.

$$\Lambda_{s_2} = \log\frac{p(y_2 \mid s_1 = 0, s_3 = 0) + p(y_2 \mid s_1 = 1, s_3 = 1)}{p(y_2 \mid s_1 = 1, s_3 = 0) + p(y_2 \mid s_1 = 0, s_3 = 1)} \quad \text{[Equation 4]}$$
$$= \log\frac{\exp\left(-\frac{|y_2 - C_{00}|^2}{2\sigma^2}\right) + \exp\left(-\frac{|y_2 - C_{11}|^2}{2\sigma^2}\right)}{\exp\left(-\frac{|y_2 - C_{10}|^2}{2\sigma^2}\right) + \exp\left(-\frac{|y_2 - C_{01}|^2}{2\sigma^2}\right)},$$

Here, $p(\alpha)$ denotes a probability density function of $\alpha$. For example, $p(y_2 \mid s_1=0, s_3=0)$ is a probability density function of combined signal $y_2$ when the value of first signal $s_1$ is zero (0) and the value of second signal $s_3$ is zero (0). $\sigma^2$ denotes a variance, and $C_{00}$, $C_{01}$, $C_{10}$ and $C_{11}$ denote the symbol candidates of combined signal $y_2$ as expressed in Equation 2, respectively.

Multiuser detector 330 produces a vector $L_2$ composed of the values detected as a result of the LLR (log likelihood ratio) computation and provides vector $L_2$ to decoder 340.

Although relay node 120 has been described to execute the LLR (log likelihood ratio) computation on BPSK modulated signals, it will be apparent to those skilled in the art that the LLR (log likelihood ratio) computation can also be applied to another signals modulated by another modulation method, such as M-QAM.

As described above, multiuser detector 330 produces vector $L_2$ with a multiuser detecting method, such as a joint ML (maximum likelihood) detecting method. Therefore, relay node 120 can decrease multi path fading even if a pre-equalizer, which is used to compensate the multi path fading, is not provided.

Decoder 340 receives vector $L_2$ having the LLR (log likelihood ratio) values and decodes vector $L_2$ using a first channel code to generate decoded vector $\hat{s}_2$. Further, decoder 340 provides decoded vector to to encoder 350.

Encoder 350 receives decoded vector $\hat{s}_2$ from decoder 340 and encodes decoded vector $\hat{s}_2$ using a second channel code to generate an encoded vector $\hat{w}'_2$. Then, encoder 350 provides encoded vector $\hat{w}'_2$ to RF transmitter 360. As described previously, the first and second channel codes have linearity, and various channel codes having linearity can be used for the first and second channel codes.

RF transmitter 360 modulates encoded vector $\hat{w}'_2$ into signal $s_2$ and transmits signal $s_2$ to first node 110 and second node 130 during time slot 2 (as depicted by a broken arrow in FIG. 3).

In another embodiment, relay node 120 is configured without decoder 340 and encoder 350. Since decoder 340 and encoder 350 are omitted, the decoding and encoding of vector $L_2$ are also omitted in this embodiment. Particularly, in response to combined signal $y_2$ transmitted from RF receiver 310 and the first and second channel information estimated by channel estimator 320, multiuser detector 330 generates vector $L_2$, and provide it to RF transmitter 360. In response to vector $L_2$, RF transmitter 360 generates signal $s_2$ without the above-mentioned decoding and encoding processes, and transmits generated signal $s_2$ to first and second nodes 110 and 130. First node 110 and second node 130 decodes signal $s_2$ using decoder 113 and 133 (Sec FIG. 1B) as discussed previously.

Accordingly, first and second nodes 110 and 130 obtain signals $s_3$ and $s_1$ respectively by XOR operations of the decoded signals of signal $s_2$ and their own signals $s_1$ and $s_3$. Since all of the channel codes used by first and second nodes 110 and 130, decoder 340 and encoder 350 have linearity, the decoded signals of signal $s_2$ satisfies linearity with respect to signals $s_1$ and $s_3$ and signals $s_1$ and $s_3$ can be obtained respectively by the XOR operation.

Figure 4:
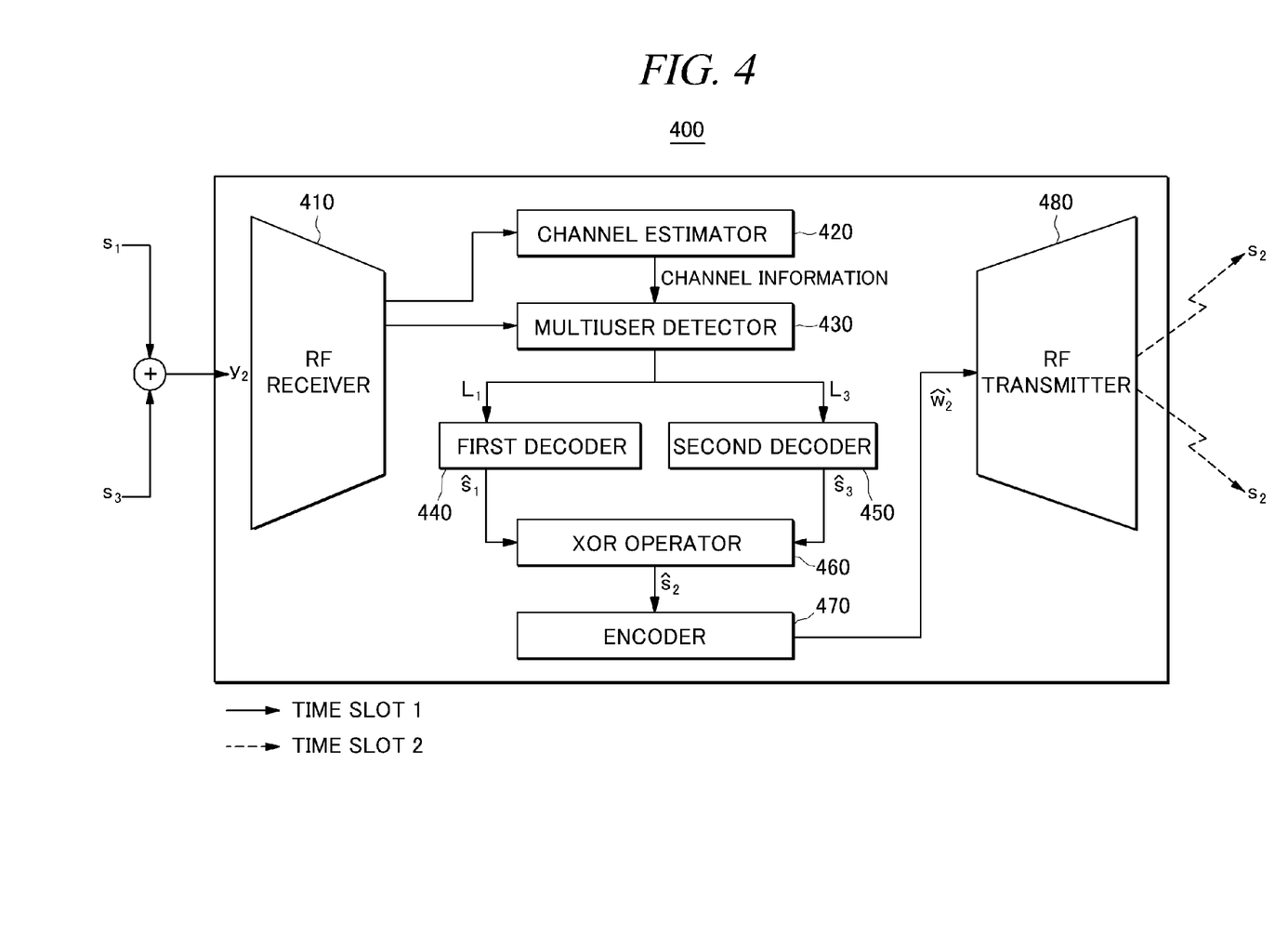
FIG. 4 shows a detailed block diagram of another illustrative embodiment of the relay node shown in FIGS. 1A and 1B.

FIG. 4 is a detailed block diagram of another illustrative embodiment of the relay node shown in FIGS. 1A and 1B. In this embodiment, a relay node 400 includes an RF (Radio Frequency) receiver 410, a channel estimator 420, a multiuser detector 430, a first decoder 440, a second decoder 450, an XOR operator 460, an encoder 470 and an RF transmitter 480. Since the function and operation of RF receiver 410, channel estimator 420, encoder 470 and RF transmitter 480 in FIG. 4 are substantially identical or similar to those of RF receiver 310, channel estimator 320, encoder 350 and RF transmitter 360 respectively in FIG. 3, redundant description thereof will be omitted herein.

Relay node 400 includes two decoders (for example, first decoder 440 and second decoder 450), while relay node 120 depicted in FIG. 3 includes one decoder 340. Further, relay node 400 includes XOR operator 460 in association with first and second decoders 440 and 450.

As in relay node 120 depicted in FIG. 3, multiuser detector 430 receives combined signal $y_2$ from RF receiver 410 and estimated first and second channel information from channel estimator 420. While multiuser detector 330 depicted in FIG. 3 detects original signal values of combined signal $y_2$, multiuser detector 430 depicted in FIG. 4 detects the values of first signal $s_1$ and second signal $s_3$ respectively from combined signal $y_2$. Then, the original signal values of combined signal $y_2$ are generated using the detected values of first signal $s_1$ and second signal $s_3$. Specifically, multiuser detector 430 detects values of first signal $s_1$ based on first channel information and second channel information estimated by channel estimator 420. Further, multiuser detector 430 detects values of second signal $s_3$ based on the first channel information and the second channel information. At this time, the values detected by multiuser detector 430 may be, but not limited to, one (1) or zero (0), and can be varied depending on the modulation method. Furthermore, multiuser detector 430 generates two vectors (first and second vectors $L_1$ and $L_3$) for first and second signals $s_1$ and $s_3$, respectively.

Particularly, multiuser detector 430 executes LLR (log likelihood ratio) computation of first signal $s_1$ and second signal $s_3$. For example, if BPSK is used as a modulation method, the LLR (log likelihood ratio) value of first signal $s_1$ is expressed by the following Equation 5.

$$\Lambda_{s_1} = \log \frac{P(s_1=0, s_3=0 \mid y_2) + P(s_1=0, s_3=1 \mid y_2)}{P(s_1=1, s_3=0 \mid y_2) + P(s_1=1, s_3=1 \mid y_2)} \quad \text{[Equation 5]}$$

Further, the LLR (log likelihood ratio) value of second signal $s_3$ is expressed by the following Equation 6.

$$\Lambda_{s_3} = \log \frac{P(s_1=0, s_3=0 \mid y_2) + P(s_1=1, s_3=0 \mid y_2)}{P(s_1=0, s_3=1 \mid y_2) + P(s_1=1, s_3=1 \mid y_2)} \quad \text{[Equation 6]}$$

In Equations 5 and 6, P(A) denotes a probability of occurrence of an event A. For example, $P(s_1=0, s_3=0|y_2)$ is a probability of occurrence of an event in which, when combined signal $y_2$ is received, the values of first signal $s_1$ and second signal $s_3$ are respectively zero (0). If the LLR (log likelihood ratio) $\Lambda_{s_1}$ or $\Lambda_{s_3}$ is equal to or less than zero (0), the value of first signal $s_1$ or second signal $s_3$ is determined as one (1). If $\Lambda_{s_1}$ or $\Lambda_{s_3}$ is larger than zero (0), the value of first signal $s_1$ or second signal $s_3$ is determined as zero (0).

Further, multiuser detector 430 produces a first vector $L_1$ composed of the LLR (log likelihood ratio) values of first signal $s_1$ and provides first vector $L_1$ to first decoder 440. Furthermore, multiuser detector 430 produces a second vector $L_3$ composed of the LLR (log likelihood ratio) values of second signal $s_3$ and provides second vector $L_3$ to second decoder 450.

First decoder 440 receives first vector $L_1$ composed of the LLR (log likelihood ratio) values of first signal $s_1$ and decodes first vector $L_1$ using a first channel code. Further, first decoder 440 provides a decoded vector $\hat{s}_1$ to XOR operator 460.

Second decoder 450 receives second vector $L_3$ composed of the LLR (log likelihood ratio) values of second signal $s_3$ and decodes second vector $L_3$ using a second channel code. Further, second decoder 450 provides a decoded vector $\hat{s}_3$ to XOR operator 460.

XOR operator 460 performs an XOR operation on decoded vector $\hat{s}_3$ and decoded vector $\hat{s}_3$. Accordingly, XOR operator 460 generates a combined vector $\hat{s}_2$ and then provides combined vector $\hat{s}_2$ to encoder 470.

Encoder 470 encodes combined vector $\hat{s}_2$ using a third channel code and then transmits an encoded vector $\hat{w}'_2$ to RF transmitter 480. RF transmitter 480 modulates encoded vector $\hat{w}'_2$ into signal $s_2$ and transmits signal $s_2$ to both first node 110 (see FIG. 1A) and second node 130 (see FIG. 1A). As described previously, the first, second and third channel codes have linearity, and various channel codes having linearity can be used for the first, second and third channel codes.

Although first decoder 440, second decoder 450 and encoder 470 are shown in FIG. 4, they are optional and may be omitted in certain embodiments. In an example embodiment in which relay node 400 is configured without first decoder 440, second decoder 450 and encoder 470, XOR operator 460 performs an XOR operation directly on first vector $L_1$ and second vector $L_3$, each received from multiuser detector 430, and RF transmitter 480 transmits a signal generated by the XOR-operation without the above-mentioned decoding and encoding processes.

Figure 5:
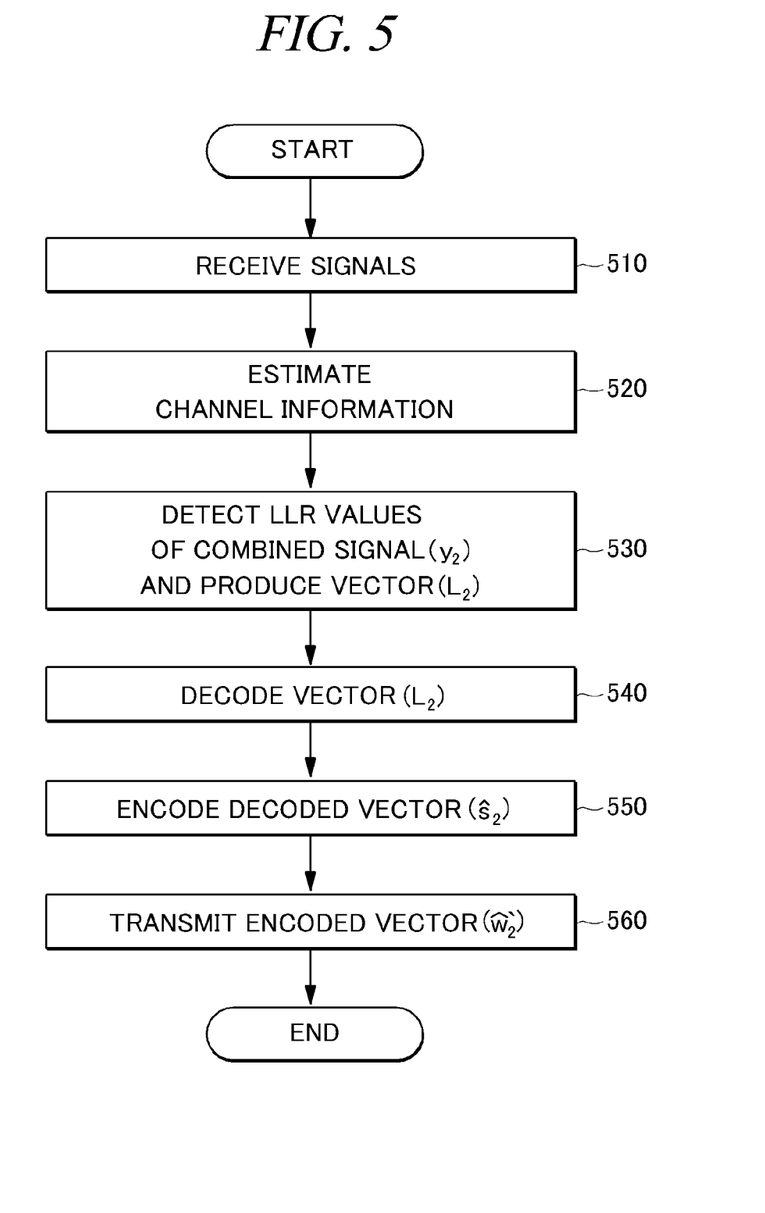
FIG. 5 is a flow diagram explaining an illustrative embodiment of a communication method.

FIG. 5 is a flow diagram explaining an illustrative embodiment of a communication method. Referring to FIGS. 1A, 1B, 3 and 5, an example embodiment of a communication method is illustrated. A signal (for example, a combined signal $y_2$) is received in a communication device (for example, relay node 120) during a certain time period (for example, time slot 1) (Operation 510). The signal includes two encoded signals (for example, first signal $s_1$ transmitted from first node 110 and second signal $s_3$ transmitted from second node 130, which is combined on a physical layer).

Channel information is estimated by using a pilot signal received by RF receiver 310 (Operation 520). The channel information includes a received power level and a channel coefficient. For example, first channel information is estimated using a first pilot signal transmitted from first node 110. The first channel information includes a first received power level and a first channel coefficient of first signal $s_1$. Further, second channel information is estimated using a second pilot signal transmitted from second node 130. The second channel information includes a second received power level and a second channel coefficient of second signal $s_3$.

Original signal values of combined signal $y_2$ received in operation 510 are detected using the first and second channel information estimated in operation 520 (Operation 530). Further, vector $L_2$ composed of the original signal values is produced by executing LLR (log likelihood ratio) computation (Operation 530). The values detected in operation 530 may be, but not limited to, one (1) or zero (0), and can be varied depending on the modulation method. Since the detailed process for detecting the original signal values of combined signal $y_2$ has already been discussed with reference to FIG. 3, redundant description thereof will be omitted herein.

Vector $L_2$ is decoded using a first channel code to generate vector $\hat{s}_2$ (Operation 540). Vector $\hat{s}_2$ decoded in operation 540 is encoded using a second channel code to generate vector $\hat{w}'_2$ (Operation 550). Vector $\hat{w}'_2$ encoded in operation 550 is modulated into signal $s_2$ and signal $s_2$ is transmitted to first node 110 and second node 130 during a predetermined period (for example, time slot 2) (Operation 560).

Signal $s_2$ is decoded into decoded vector $\hat{s}_2$ at first node 110 and first node 110 performs XOR-operation on decoded vector $\hat{s}_2$ and signal $s_1$ to obtain or generate second signal $s_3$ that has been transmitted from second node 130. Further, signal $s_2$ is decoded into decoded vector $\hat{s}_2$ at second node 130 and second node 130 performs XOR-operation on decoded vector $\hat{s}_2$ and signal $s_3$ to obtain or generate first signal $s_1$ that has been transmitted from first node 110.

Figure 6:
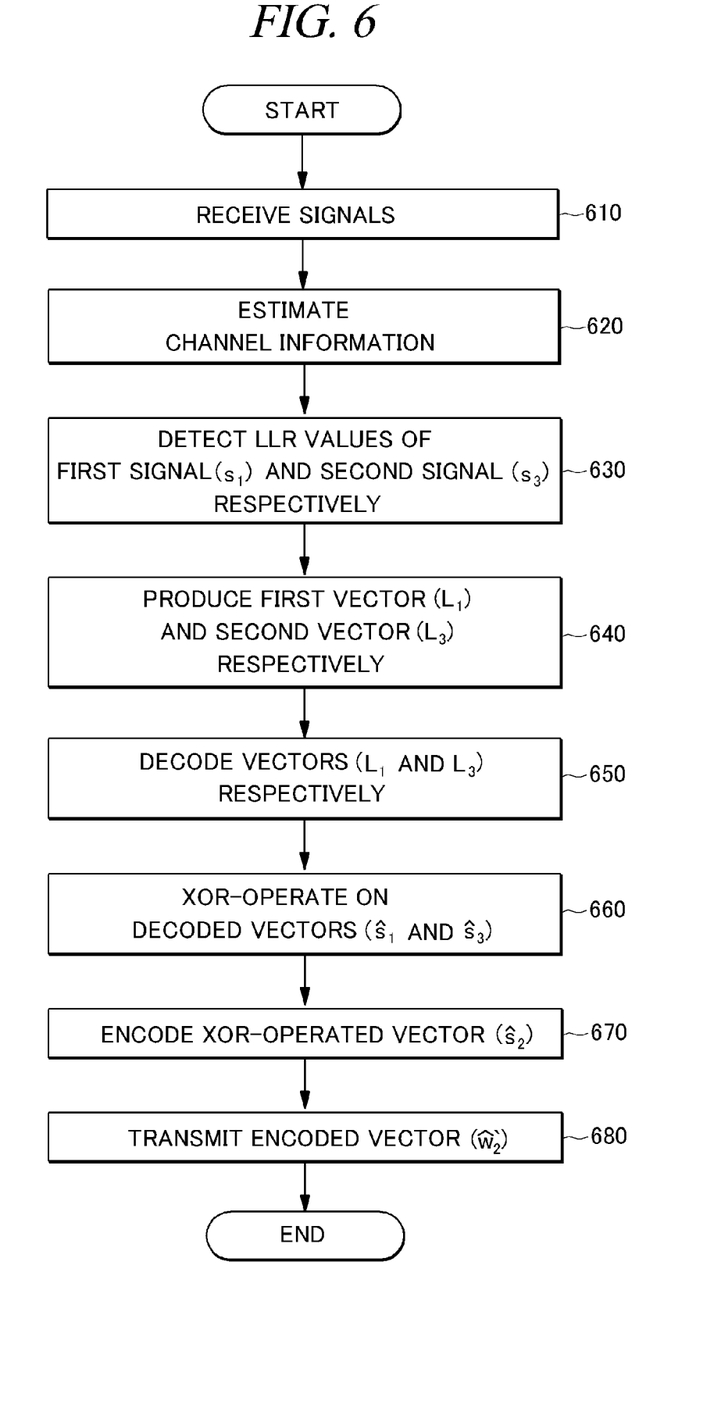
FIG. 6 is a flow diagram explaining another illustrative embodiment of a communication method.

FIG. 6 is a flow diagram explaining another illustrative embodiment of a communication method. Referring to FIGS. 1A, 1B, 4 and 6, an example embodiment of a communication method is illustrated. Since the function and process of operation 610 and 620 in FIG. 6 may be similar to those of operation 510 and 520 respectively in FIG. 5, redundant description thereof will be omitted herein.

As compared to operation 530 in FIG. 5 in which the values of one combined signal $y_2$ are detected, the values of two signals (first signal $s_1$ and second signal $s_3$) are detected, respectively (Operation 630). The values of first signal $s_1$ are detected using first channel information and second channel information estimated in operation 620 and the values of second signal $s_3$ are detected using the first channel information and the second channel information estimated in operation 620. The values of first signal $s_1$ and second signal $s_3$ can be detected using, but not limited to, LLR (log likelihood ratio) computation of first signal $s_1$ and second signal $s_3$, respectively. Since the detailed process for detecting the values of first signal $s_1$ and values of second signal $s_3$ is already discussed with reference to FIG. 4, redundant description thereof will be omitted herein.

Further, first vector $L_1$ is produced by executing LLR (log likelihood ratio) computation of first signal $s_1$ and second vector $L_3$ is produced by executing LLR (log likelihood ratio) computation of second signal $s_3$, respectively (Operation 640). The detected values may be, but not limited to, one (1) or zero (0), and can be varied depending on the modulation method.

First vector $L_1$ is decoded using a first channel code and second vector $L_3$ is decoded using a second channel code (Operation 650). Accordingly, decoded vectors $\hat{s}_1$ and $\hat{s}_3$ are generated.

An XOR operation is performed on decoded vectors $\hat{s}_1$ and $\hat{s}_1$ and thus combined vector $\hat{s}_2$ is generated (Operation 660). Then, combined vector $\hat{s}_2$ is encoded to generate vector $\hat{w}'_2$ using a third channel code (Operation 670). Encoded vector $\hat{w}'_2$ is modulated into signal $s_2$ and signal $s_2$ is transmitted to both first node 110 and second node 130 during a predetermined period (for example, time slot 2) (Operation 680).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a second third, middle third and first third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A communication method comprising:
    receiving a combined signal including a first signal transmitted from a first node and a second signal transmitted from a second node;
    estimating first channel information of the first signal using a first pilot signal and second channel information of the second signal using a second pilot signal;
    detecting original signal values of the combined signal using the estimated first and second channel information;
    decoding a vector composed of the original signal values detected by a multiuser detector using a first channel code;
    encoding the decoded vector using a second channel code to generate an encoded vector; and
    transmitting a third signal generated based on the encoded vector during a predetermined period to the first node and the second node, wherein the third signal represents the encoded vector.

2. The communication method of claim 1, wherein the original signal values are detected by a multiuser detecting method comprising a joint-ML (maximum likelihood) detecting method.

3. The communication method of claim 1, wherein the first channel code and the second channel code have linearity.

4. The communication method of claim 1, wherein the original signal values are detected by a multiuser detecting method comprising a LLR (log likelihood ratio) detecting method.

5. The communication method of claim 1, wherein the first channel information includes a received power level and a channel coefficient of the first signal, and the second channel information includes a received power level and a channel coefficient of the second signal.

6. The communication method of claim 1, further comprising modulating the encoded vector onto a carrier signal to generate the third signal.

* * * * *

UNITED STATES PATENT AND TRADEMARK OFFICE
CERTIFICATE OF CORRECTION

PATENT NO. : 8,913,526 B2
APPLICATION NO. : 13/867906
DATED : December 16, 2014
INVENTOR(S) : Jung It is certified that error appears in the above-identified patent and that said Letters Patent is hereby corrected as shown below:

In the Specification

In Column 6, Line 36, delete "$to\ to$" and insert -- $\hat{s}_2\ to$ --, therefor.

In Column 8, Line 20, delete "$\hat{s}_3\ and$" and insert -- $\hat{s}_1\ and$ --, therefor.

In Column 9, Line 56, delete "$\hat{s}_1\ and$" and insert -- $\hat{s}_3\ and$ --, therefor.

Signed and Sealed this
Sixteenth Day of June, 2015

Michelle K. Lee
*Director of the United States Patent and Trademark Office*